Figure 1:
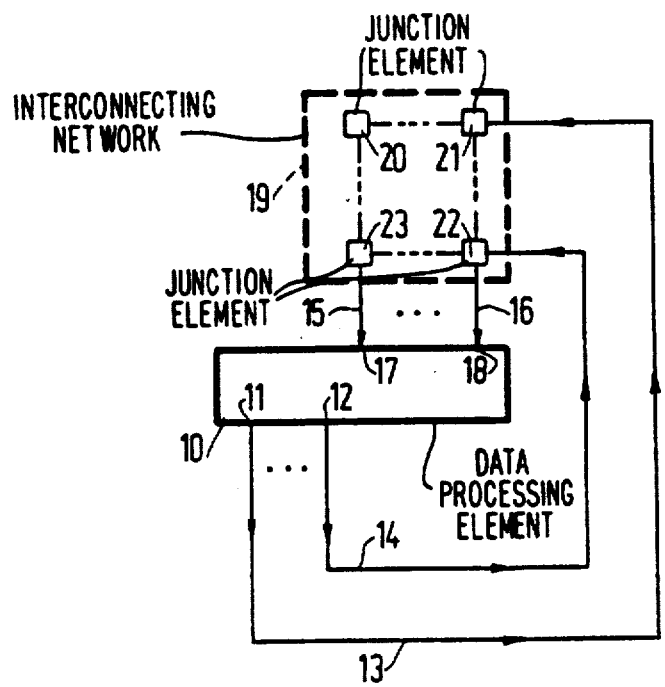

United States Patent [19]

Dijkstra et al.

[11] Patent Number: 5,109,488
[45] Date of Patent: Apr. 28, 1992

[54] DATA PROCESSING SYSTEM BUFFERING SEQUENTIAL DATA FOR CYCLICALLY RECURRENT DELAY TIMES, MEMORY ADDRESS GENERATOR FOR USE IN SUCH SYSTEM

[75] Inventors: Hendrik Dijkstra; Cornelis M. Huizer; Robert J. Sluijter, all of Eindhoven, Netherlands

[73] Assignee: U.S. Philips Corp., New York, N.Y.

[21] Appl. No.: 316,720

[22] Filed: Feb. 28, 1989

[30] Foreign Application Priority Data

Mar. 30, 1988 [NL] Netherlands ............... 8800801

[51] Int. Cl.$^5$ ............... G06F 12/02; G06F 13/372; G06F 13/42; G06F 13/16
[52] U.S. Cl. ............... 395/250; 364/238.4; 364/239; 364/239.1; 364/239.4; 364/239.5; 364/239.51; 364/239.7; 364/239.8; 364/240.5; 364/251.3; 364/251.4; 364/256.8; 364/271; 364/271.5; 364/271.6; 364/DIG. 1
[58] Field of Search ... 364/200 MS File, 900 MS File

[56] References Cited

U.S. PATENT DOCUMENTS

| | | | |
|---|---|---|---|
| 4,287,566 | 9/1981 | Culler | 364/200 |
| 4,365,292 | 12/1982 | Barnes et al. | 364/200 |
| 4,400,768 | 8/1983 | Tomlinson | 364/200 |
| 4,811,201 | 3/1989 | Rau et al. | 364/200 |

OTHER PUBLICATIONS

Communication from the European Patent Office in a corresponding application 89 200756.8.

*Primary Examiner*—Thomas C. Lee
*Assistant Examiner*—Daniel Pan
*Attorney, Agent, or Firm*—Lesley Rhyne

[57] ABSTRACT

A data processing system buffers sequential data for the duration of cyclically recurrent delay times. Memory location allocation is performed in such a way, that the memory is used efficiently without data-shifting after a read-out, and that the address generator is fairly simple.

10 Claims, 2 Drawing Sheets

DATA PROCESSING SYSTEM BUFFERING SEQUENTIAL DATA FOR CYCLICALLY RECURRENT DELAY TIMES, MEMORY ADDRESS GENERATOR FOR USE IN SUCH SYSTEM

FIELD OF THE INVENTION

The invention relates to a data processing system comprising a memory for buffering sequential data units for the duration of cyclically recurrent delay lengths. The invention likewise relates to selecting means for generating a periodic sequence of time slots having lengths corresponding with the delay lengths for each one of at least two memory locations, suitable for use in such a system.

BACKGROUND ART

A data processing system of the type mentioned in the opening paragraph is known from "Efficient Code Generation for Horizontal Architectures: Compiler Techniques and Architectural Support", by Rau et al., 9th Annual Symposium on Computer Architecture, Austin, 1982, pp. 131-139. This literature also extensively discusses a field of application, namely parallel and iterative data processing. In this kind of data processing, new streams are created from various parallel streams of sequential data units of sequential data units. Before allowing the data units of the new streams to undergo processes again, these data units are to be delayed with respect to one another in order to be in a position to combine them with one another at the proper instant and in the proper manner. Since the series of operations is repeated cyclically, the delay of data units is effected by means of a temporary storage in a memory for the duration of cyclically recurrent delay times. Buffering the data units in the prior-art data processing system is effected with the aid of compacting means. These compacting means provide that, if so desired, after a data unit has been read out from one of the memory locations, the remaining stored data units can be rearranged over logically linked memory locations. When a new data unit is written, it is written into an unoccupied memory location having an address which is as near as possible to an address of the occupied memory locations. This rearranging of the data units, as well as the updating of the address of the nearest unoccupied memory location, leads to an efficient use of the available memory locations, admittedly, but requires a considerable amount of hardware.

OBJECT OF THE INVENTION

Therefore, it is an object of the invention to provide a data processing system in which the available memory locations are utilized substantially as efficiently as done according to the state of the art while utilizing less hardware.

GENERAL DISCLOSURE OF THE INVENTION

For this purpose, a data processing system according to the invention is characterized in that a memory address generator is provided for generating, for each one of at least two memory locations, a periodic sequence of time slots having lengths corresponding to the delay lengths, each time slot for a memory location beginning with a write phase for the relevant data unit and ending in a read phase, in which read phase the relevant data unit is read for the last time, and in which sequence a sequence period includes a permutation of the time slots whose lengths correspond to the cyclically recurrent delay lengths, in which permutation the read phase of the preceding time slot is followed by a next-sequentially possible write phase of a further time slot, and a mutual shift between the sequences at consecutive memory locations amounts to a single cycle, and the period is equal to a sum of the mutual shifts.

A data occupation thus attained provides an efficient utilization of memory locations without rearrangements and without the hardware required for the rearrangements. No larger number of memory locations are required than the number of consecutive cycles in which the period of the sequence of time slots can be fitted. The period itself contains a permutation of time slots organized according to a first-fit algorithm. The respective time slots correspond with the respective delay lengths assigned per cycle. As a result of the mutual shift between the various occupied memory locations the joint memory locations have a time slot occupation per cycle which corresponds with the time slot occupation of the period.

An embodiment of a data processing system according to the invention is characterized, in that the memory address generator includes reference value generator for generating a next reference value at the start of each next cycle of delay lengths, a sequence of reference values being recurrent with a period of the sequence of time slots, and also includes first and second adders respectively, for generating for the memory read addresses and write addresses respectively, by means of linearly combining cyclically recurrent first and second increments respectively, with a current reference value. The read addresses and write addresses are determined per cycle, relative to the reference value. Since the reference value leaps at the start of a next cycle, the read addresses and write addresses will leap as well relative to those from the previous cycle. After the number of cycles that covers a period a period, the read addresses and write addresses will be repeated again.

A further embodiment of a data processing system according to the invention is characterized in that the reference value generator includes a modulo counter whose count represents the current reference value. This provides a simple manner to produce periodic reference values. A still further embodiment of a data processing system according to the invention is characterized in that a leap between sequential reference values and the increments are adjustable. The adjustability of the reference value and the increments renders the system suitable for use in more than one application.

Another embodiment of a data processing system according to the invention is characterized in that the memory address generator includes third and fourth adders respectively, for consecutively generating first addresses and second addresses for the memory, respectively, by consecutively linearly combining a cyclically recurrent third and fourth increment respectively, with a preceding first address. The first and second addresses are either the write addresses and the read addresses or the read addresses and the write addresses. With a suitable choice of the increments to be fed to the adders, this arrangement saves a modulo counter when compared to one of the embodiments mentioned hereinbefore.

PREFERRED EMBODIMENTS

Figure 2:
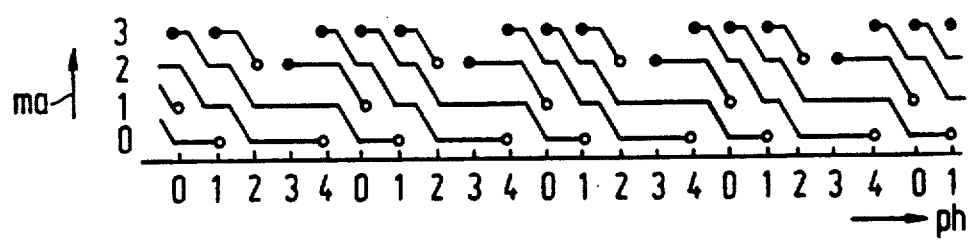
Figure 3:
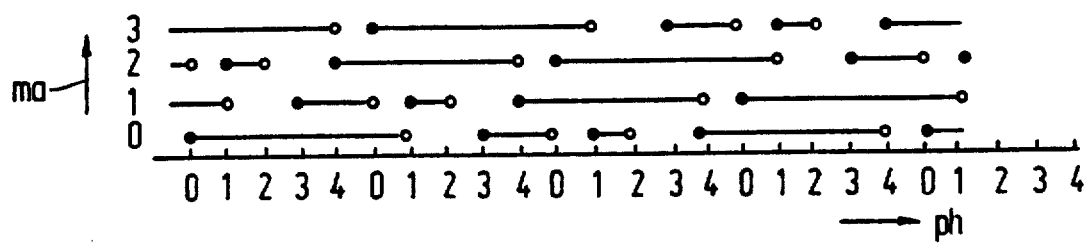
Figure 4:
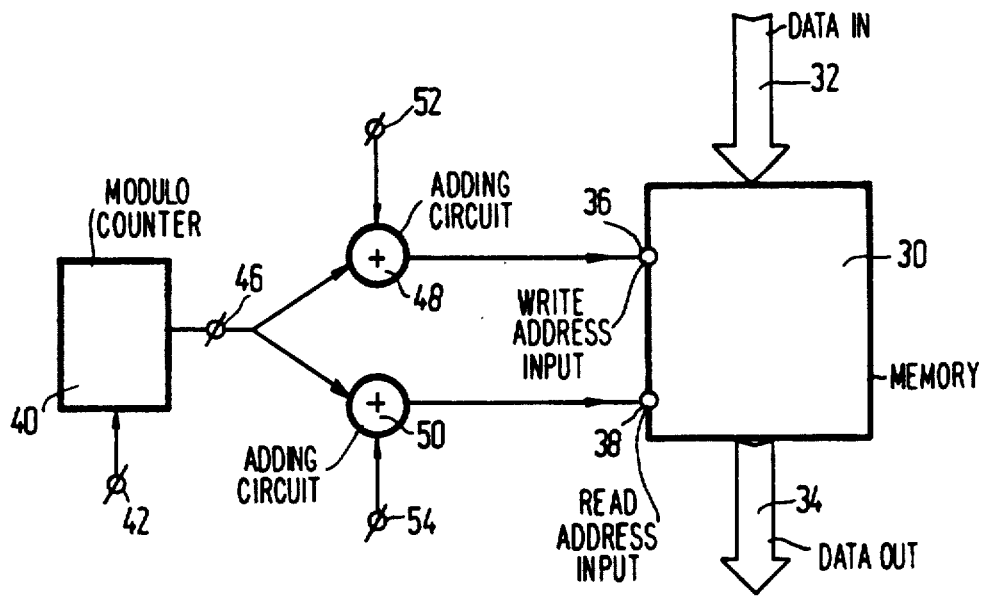
Figure 5:
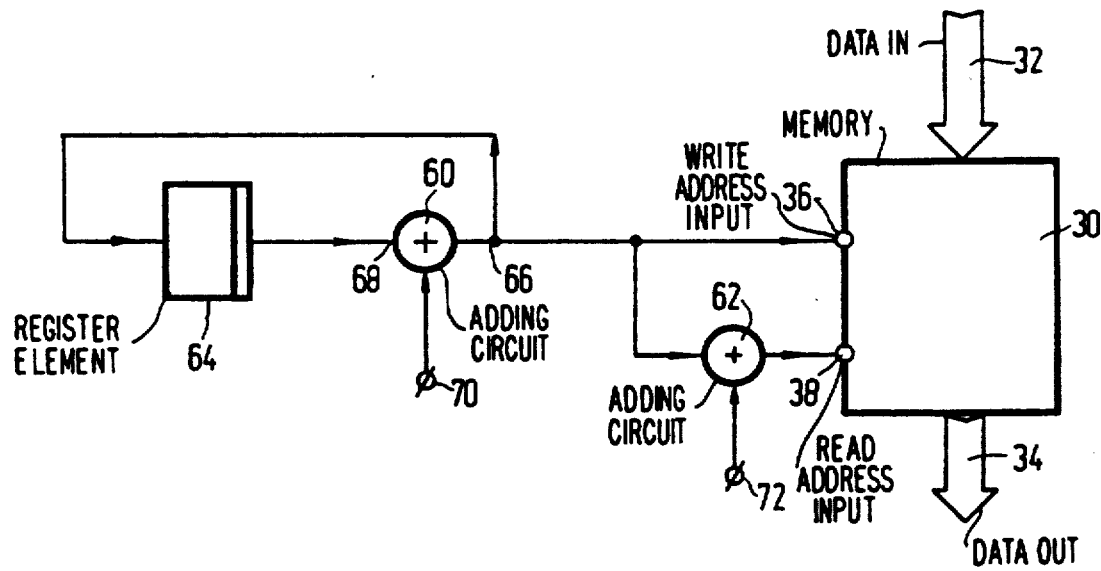

The invention will be illustrated with reference to a drawing Figure in which:

FIG. 1 shows a block diagram of a data processing system of the above type,

FIG. 2 shows an example of the way in which data occupation is created on memory locations in the prior art data processing system, FIG. 3 shows an example of the way in which data occupation is created on memory locations in a data processing system according to the invention, FIG. 4 shows a first implementation of a memory having a memory address generator in a data processing system according to the invention, and FIG. 5 shows a second implementation of a memory having a memory address generator in a data processing system according to the invention.

FIG. 1 shows in a block diagram an example of a data processing system of the aforementioned type. The example shows a data processing element 10 having data outputs 11 and 12 which are linked via data output lines 13 and 14 and data input lines 15 and 16 to data inputs 17 and 18. The link is provided by an interconnecting network 19 in which junction elements 20, 21, 22 and 23 are provided at the junctions of a data output line and a data input line. These junction elements discribute data units from the various streams fed via output lines 13 and 14 over the input lines before the data are subjected to a new process in element 10. In order to combine data units that are not simultaneously available on the data output lines, the junction elements comprise memory locations for buffering data units for the duration of predetermined periods of time. Because the data units are subjected to a cyclic sequence of processes, these periods of time are also cyclically recurrent.

FIG. 2 shows an example of the way in which data occupation is created of memory locations of the prior art data processing system. In a five-phase cycle, having the phases 0, 1, 2, 3 and 4, data units are buffered at memory locations having addresses 0, 1, 2 and 3. The phases (ph) are plotted horizontally, the addresses of the memory locations (ma) vertically. In phases 0, 1, 3 and 4 of a cycle, data units are written which are buffered for the duration of 6, 1, 2 and 5 phases, respectively. Reading out these data units is then effected in phase 1 of the next cycle, phase 2 of the same cycle, phase 0 of the next cycle and phase 4 of the next cycle. The data units having write phases 0, 1 and 4 are all written in the memory location having the address 3. The data unit of the write phase 3 is written in memory location 2. As soon as a memory location of a lower address falls vacant, the data units at memory locations of a higher address are transferred to this lower address. Admittedly, this will lead to an efficient use of the available memory locations, but on the other hand requires a considerable amount of logic for monitoring the logically nearest unoccupied memory location and for rearranging the data units among the memory locations.

FIG. 3 shows an example of the way in which data occupation is created on memory locations in a data processing system in accordance with the invention. The cycle which was used for the previous Figure is used here too. Now, a data occupation per memory location is attained which is periodic and has a period of four cycles in each one of the time slots. The respective time slots correspond to the delay lengths per cycle. Memory location 0 is occupied by a first data unit for 6 consecutive phases. After this memory location is read, the next, second data unit is written into the same memory location with a write phase which is the earliest in succession to the read phase of the first data unit and of which a delay length has not yet been included in the said period. This will then be the data unit having write phase 3 and read phase 0 of a next cycle. The same selection criteria apply for the data units having write phases 1 and 4. The illustrated time slot permutation will realize the shortest period length. Corresponding data occupations are realised at memory locations 1, 2 and 3. The data occupation at the memory locations are shifted relative to one another by one cycle. The data occupation provided in this example requires as many memory locations as the data occupation which was discussed with reference to FIG. 2, but requires considerably less hardware because rearrangements of the data units over the memory locations are avoided. For clarity, the above examples are restricted to cycles of four different delay lengths. The advantages of a data processing system according to the invention already present themselves as being non-trivial when, in one cycle, three data units are buffered and are evident when, in one cycle, a large number (for example: twenty) of data units are buffered.

FIG. 4 represents a first implementation of a memory having a memory address generator in a data processing system in accordance with the invention. A memory 30 is shown having memory locations for buffering sequential data units. The incoming data stream is designated by reference numeral 32, the outgoing data stream by reference numeral 34. Through input 36, 38 respectively, write addresses and read addresses, respectively, of the memory are received. The periodicity per memory location and the mutual shift in the sequences are realized by a modulo counter 40 whose contents leaps per cycle by a predetermined value, induced by a trigger pulse on input terminal 42 preceding a next cycle. Thereto, for each cycle a fixed leap value is added to the current count. An output signal at output terminal 46 then represents a reference value leaping by a fixed step per cycle. This reference value is fed to adding circuits 48 and 50. Adding circuit 48 receives the cyclic first increments and adding circuit 50 the cyclic second increments via terminals 52 and 54, respectively. These circuits furnish the current write address and the actual read address of a memory location in memory 30 by adding said increments to the current reference value. It will be readily understood that a modulo counter having the counts 0, 1, 2 and 3 is suitable for the example discussed with reference to FIG. 3, while per cycle a fixed step equal to the number one is subtracted from the current count value representing the current reference value.

FIG. 5 represents a second implementation of a memory having a memory address generator in a data processing system in accordance with the invention. The elements corresponding with those in FIG. 4 are designated by the same reference numerals. The memory address generator now include a first and a second adding circuit 60 and 62 respectively, as well as a register element 64 which is inserted between the output 66 and the first input 68 of adding circuit 60. The second input 70 of adding circuit 60 receives sequential, cyclically recurrent third increments. The current third increment is added to the content of the memory element 64. The sum represents the next write address. The sum is also applied to a first input of the second adding circuit 62, to a second input 72 of which sequential, cyclically recurrent fourth increments are applied. The sum furnished by the second adding circuit then represents the next read address.

The memory address generator, parts of which are represented in FIGS. 4 and 5, may be restricted to embodiments in which each time no more than one single address is applied to the memory. However, means will then be provided indeed for establishing whether the address provided is a read address or a write address. The disadvantage that reading and writing are mutually exclusive per operation, during which the address is provided, will then be offset by the advantage that a relatively low-speed memory can be used.

We claim:

1. A data processing system comprising
   a) a data input for receiving sequential data units;
   b) a data output;
   c) a memory coupled between the data input and the data output and having a plurality of memory locations, for buffering a respective next data unit for the duration of a respective next time delay in a recurrent cycle of time delays;
   d) a memory address generator coupled to the memory for generating for each respective memory location a respective sequence of time slots, wherein
      i) each respective time slot starts with an associated write instruction for the respective memory location and terminates with an associated last read instruction for the respective memory location;
      ii) each respective time slot is representative of the respective time delay;
      iii) each sequence of time slots is periodic with a period consisting of a first permutation of time slots, the first permutation being indicative of a second permutation of the delay times per cycle;
      iv) in each first permutation the next time slot is the time slot that has its write instruction executed the earliest with regard to the remaining time slots in the first permutation; and
      v) the sequences are mutually staggered by one cycle.

2. A system as in claim 1 wherein the memory address generator comprises:
   a) a first adder having a first adder output coupled to the memory for providing a next read address to the memory by linearly combining a respective first increment at a first adder input with a preceding read address;
   b) a second adder having a second adder output coupled to the memory for providing a next write address to the memory by linearly combining a respective second increment with the preceding read address;
   c) a register element coupled between the first adder input and the first adder output for storing the preceding read address.

3. A system as in claim 2, wherein the first and second increments are adjustable.

4. A system as in claim 1 wherein the memory address generator comprises:
   a) a first adder having a first adder output coupled to the memory for providing a next write address to the memory by linearly combining a respective first increment at a first adder input with a preceding write address;
   b) a second adder having a second adder output coupled to the memory for providing a next read address to the memory by linearly combining a respective second increment with the preceding write address;
   c) a register element coupled between the first adder input and the first adder output for storing the preceding write address.

5. A system as in claim 4, wherein the first and second increments are adjustable.

6. A system as in claim 1 wherein the memory address generator comprises:
   a) a reference value generator for at a start of each next cycle generating a next reference value, a series of successive reference values being periodic with the period of the time slot sequence;
   b) a first adder connected to the reference value generator for receiving the next reference value and for sequentially receiving cyclically recurrent respective first increments for, by linearly combining the reference value with the respective first increment, providing a respective read address to the memory;
   c) a second adder coupled to the reference value generator for receiving the next reference value and for sequentially receiving cyclically recurrent respective second increments for, by linearly combining the reference value with the respective second increment, providing a respective write address to the memory.

7. A system as in claim 6 wherein the reference value generator includes a modulo counter.

8. A system as in claim 6 wherein a leap between two consecutive reference values is adjustable.

9. System as in claim 6, wherein the memory is adapted to receive at least first and second parallel flows of sequential data units, for each flow the system comprises a respective arrangement of the first adder and the second adder, each arrangement being coupled to the reference value generator.

10. A system as in claim 6 wherein the first and second increments are adjustable.

* * * * *